Figure 1:
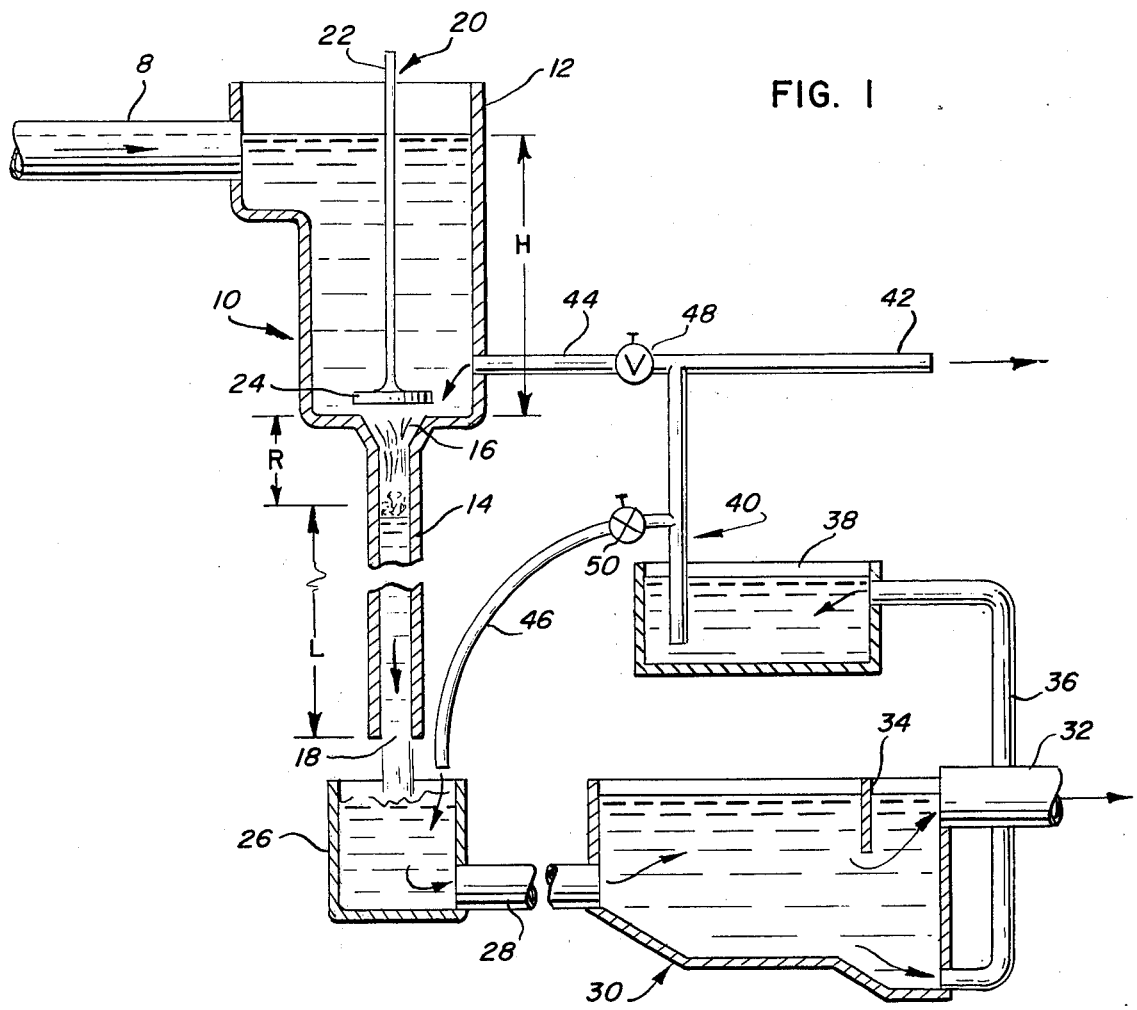

United States Patent [19]
Bauer

[11] 3,939,066
[45] Feb. 17, 1976

[54] SEWAGE TREATMENT PROCESS

[76] Inventor: William J. Bauer, 422 South Park Road, La Grange, Ill. 60525

[22] Filed: Aug. 6, 1974

[21] Appl. No.: 495,212

Related U.S. Application Data

[63] Continuation of Ser. No. 290,853, Sept. 21, 1972, abandoned.

[52] U.S. Cl. .......................... 210/6; 210/7; 210/15; 241/2
[51] Int. Cl.² .......................................... C02C 1/08
[58] Field of Search ................ 55/15, 117; 137/572; 210/3–8, 14, 15, 96, 194, 195, 197, 219, 220, 67, 83, 152, 173; 251/144; 261/DIG. 54; 241/1, 2, 24

[56] References Cited
UNITED STATES PATENTS

| | | | |
|---|---|---|---|
| 2,243,826 | 5/1941 | Nielsen et al. | 210/96 X |
| 2,270,869 | 1/1942 | Ditto et al. | 210/8 |
| 2,720,213 | 10/1955 | Whitcomb, Jr. | 137/572 X |
| 3,135,686 | 6/1964 | Campbell et al. | 210/7 |
| 3,271,304 | 9/1966 | Valdespino et al. | 210/5 |
| 3,385,030 | 5/1968 | Letvin | 261/DIG. 54 |
| 3,432,264 | 3/1969 | Bostwick et al. | 261/DIG. 54 |

OTHER PUBLICATIONS

Perry's Chem. Eng. Handbook, Perry et al., 4th Ed., 1963, McGraw–Hill Co., "The Flow of a Real Fluid," pp. 138–140, 174–176.

*Primary Examiner*—Charles N. Hart
*Assistant Examiner*—Robert H. Spitzer
*Attorney, Agent, or Firm*—Neuman, Williams, Anderson & Olson

[57] ABSTRACT

Sewage is subjected to a sudden pressure release to break up the organic solids particles for improving subsequent treatment or separation operations.

11 Claims, 2 Drawing Figures

SEWAGE TREATMENT PROCESS

This is a continuation, of application Ser. No. 290,853 filed Sept. 21, 1972 now abandoned.

This invention relates to the processing of waste materials and more particularly to improvements in processes and apparatus for extracting or treating the solids in sewage.

Many processes for treating sewage materials are dependent upon time, efficiency and other factors which are related to the size of the individual particles of solids to be treated or separated. By way of example, bacterial digestion processes can be expedited if there is complete exposure of the solids to the bacteria, as by having the solids finely divided and thoroughly mixed in the medium where digestion occurs. Similarly, treatments which rely upon contact with or reaction with additives normally are enhanced where the solids are in the form of very small particles. Antipathogenic treatment, such as with chlorine, oxygen or ozone, may only reach the surface layers of large particles, leaving viable pathogens in the particle cores for later escape unless prolonged treatment is carried out or excess additives are provided. Accordingly, often it is desirable that the solids in sewage materials be in the form of fine particles for treatment processes. Moreover, since sewage handling processes normally involve large quantities of materials, it is further desirable that treatment operations be carried out at a rapid rate, and preferably on a high volume continuous basis.

It is an object of this invention to provide improvements meeting the aforementioned requirements.

It is another object of this invention to provide improvements which will increase the efficacy of waste handling and treatment systems and processes.

It is an object of this invention to provide improved processes and apparatus for removing solids from waste materials such as sewage.

It is a more specific object of this invention to provide improved apparatus and processes for preparing sewage solids for subsequent biological treatment, chemical treatment or other processing.

It is another object of this invention to provide improved apparatus and processes for expanding and comminuting particles of solids in sewage, sludge or the like, and particularly on a continuous operation basis.

Further and additional objects and advantages of this invention will be apparent to those skilled in the art from the following description, the accompanying drawings and the appended claims.

In accordance with teachings of this invention sewage is caused to flow through a hydraulic system which subjects the sewage to a sudden substantial drop in pressure, along with an attendant increase in velocity, and violent turbulence or agitation. By way of example, the pressure may be decreased on the order of 20 psi in 1/10 second or less, and the sewage may be subjected to turbulent flow while under a vacuum. The resulting material evidences a marked increase in the amount of suspended solids and a marked decrease in the amount of settleable solids, as compared to the input sewage material.

It is believed that the sudden decrease of pressure causes the larger organic solids particles to disintegrate or "explode", perhaps due to expansion of absorbed gases or gases generated within the particles by anaerobic bacterial digestion. Such gas producing phenomena may continue within particles of solid wastes, even though the exterior surface has been exposed to aerobic conditions. In any event, the sudden pressure drop and violent turbulence apparently cause comminution of the solids particles into many smaller particles and thorough mixing, resulting in apparent homogenization of the particles in the sewage.

The resultant sewage material then may be subjected to bacterial adsorption and ingestion, or biological treatment as it is called. The production of many smaller particles results in a greatly increased total surface area of solids particles for exposure to the action of natural bacteria which consume the organic sewage as food. If such bacteria are brought into intimate contact with such particles, as can be done during the turbulent flow and agitation, the bacteria will adsorb the particles of sewage on their surfaces for later consumption as food. This adsorption can take place in a matter of seconds or minutes. The bacteria and associated adsorbed particles are then settled or otherwise separated from the remainder of the sewage mixture and removed as a sewage sludge. The remaining effluent has a greatly reduced quantity of organic waste materials in it, comparable in many instances to the character of effluent from an activated sludge treatment plant.

The sludge may be kept in an aerobic condition by addition of air or oxygen so that the metabolism of the bacteria and the associated consumption of the attached organic wastes by these bacteria will proceed at a rapid rate. A portion of this sludge, following a time of aeration or oxygenation, may be recycled back into the system in the pressure drop and/or agitation zones for adding and mixing bacteria with the small particles of waste materials produced by the passage of additional sewage through the system to enhance the adsorption and ingestion processes.

For a more complete understanding of the invention, reference should be had to the illustrative embodiment shown in the accompanying drawings and described below.

IN THE DRAWINGS

Figure 2:
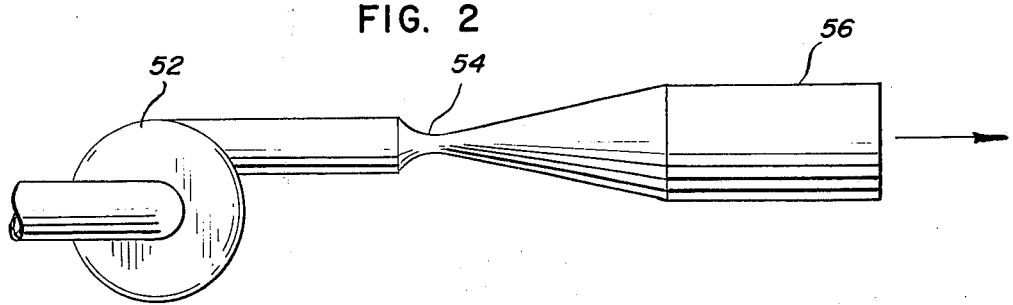

FIG. 1 is a schematic illustration of one system employing teachings of this invention; and FIG. 2 is a schematic illustration of a pump and a diffuser which may be used in other embodiments.

Referring to the system of FIG. 1, a conduit 8 feeds sewage to a reactor 10 comprising a receptacle 12 and an elongated vertical conduit 14 in open communication with a bottom opening 16 in the receptacle. The receptacle 12 serves as a temporary reservoir or accumulator for the sewage. The conduit 14 has an open lower outlet end 18 and serves as a reactor shaft or passage, as will be described further below. A plunger 20 includes an operating stem 22 and a valve head 24 which serves as a flow constrictor and vortex suppressor to control the outflow from the reservoir 12 to the reactor shaft 14. The plunger 20 prevents formation of a vortex and avoids ventilation of the outflow zone from the top as well as serving as an on/off valve if desired. A receptacle 26 is provided beneath outlet 18 and forms a plunge pool for the outflow from the conduit 14.

A conduit 28 is connected to the receptacle 26 and leads to a clarifier 30. A discharge outlet 32 carries away the clarified effluent, and may lead to apparatus (not shown) for further treatment. The separated bacteria and associated fine particles of organic wastes which settle in the clarifier occupy a much smaller volume than the effluent, e.g., only 1 or 2% of the volume of the effluent. This smaller volume of bacteria and associated fine particles of organic wastes, or sludge as it is called, normally is comprised of less than about 5% of solids and more than about 95% water. An appropriate skimmer 34 is provided in the clarifier to assist in separating the solids and the clarified effluent. A conduit line 36 carries the sludge from the clarifier 30 to an aeration and oxygenation tank 38. A further conduit system 40 conveys the sludge from the tank 38 to a waste sludge outlet line 42. The system 40 includes conduits, such as indicated at 44 and 46, with associated controls such as variable valves 48 and 50, for recycling controlled amounts of the sludge to the receptacle 12 and/or to the plunge pool 26, respectively. The treatment apparatus represented by clarifier 30, tank 38 and related components may be of any appropriate type in accordance with the treatment desired.

In the operation of the system of FIG. 1, the level of the sewage in reservoir 12 provides a pressure head H for the flow of the material into the shaft 14. The shaft is of sufficient vertical length from inlet 16 to outlet 18 to accomplish two related effects. The shaft flows full over a portion of its lower length, below a primary reactor pressure drop zone immediately beneath the inlet opening 16. The reactor zone is indicated generally by the dimension R in FIG. 1. The full conduit flow prevents ventilation of the reactor zone by reverse flow of air upward through the shaft. Moreover, the full flow portion beneath the primary reactor zone is of an appropriate length, as indicated by the dimension L, to draw a strong vacuum, i.e., reduce the absolute pressure substantially below atmospheric pressure to near absolute zero pressure, to cause flow separation in the reactor zone. Such flow conditions can be established simply by providing a shaft 14 of adequate length, e.g., substantially greater than the atmospheric pressure head, with due allowances relative to its diameter and frictional characteristics and to the characteristics of the fluent input material, and providing an adequate inflow supply to the receptacle 12.

As a result of the foregoing, sewage flowing from receptacle 12 into the upper portion of the shaft 14 passes abruptly from a zone of positive pressure due to head H in the bottom of receptacle 12 to the subatmospheric or negative pressure in the reactor zone. The distance traversed in this pressure change is on the order of one or two shaft diameters and occurs in a time period on the order of 1/10 second or less. Apparently this causes breaking up of the particles as by sudden expansion of internal gases or other expansion.

Along with the sudden pressure drop, the material will be rapidly accelerated to substantial velocities. Under flow conditions providing adequate vacuum as described, the flow stream will be separated or disrupted in the reactor zone to the extent that separated water vapor and released gases and a constricted or separated fluid stream will occur in the primary reaction zone. This will enhance the turbulence, agitation and mixing action in this area and immediately therebelow. Further agitation and mixing occurs in the subsequent full conduit flow area, and also particularly in the high velocity discharge into the plunge pool.

By way of one specific example, sewage was passed through a reactor corresponding to reactor 10 wherein shaft 14 was a vertical pipe of 12 inches I.D. and 100 feet long. A plunge pool was provided immediately beneath the pipe outlet 18. Reservoir 12 was substantially larger in cross-section, i.e., about 4 feet, and was maintained at a level to provide a head H of about 10 feet. Flow rates were adjusted by adjusting plunger 24, with satisfactory results being observed over flow rates of from about 3 FPS to about 50 FPS. At higher rates it appears that frictional factors were sufficient to maintain adequate pressures in the upper portion of the pipe to preclude the desired sudden pressure drop. At lower flow rates, counter flow ventilation and/or other factors apparently prevented maintenance of an adequate length of full pipe flow to generate adequately low pressures in the upper portion of the pipe. Within the noted range, a vacuum zone apparently occurred in the top of the pipe 14, immediately beneath reservoir 12, with the sewage encountering a pressure drop on the order of 15– 20 psi from the positive pressure in the bottom of the reservoir to the vacuum in the reactor area in about 1/10 second or less as described above for reactor 10. It will be noted that the related change in velocity in this system was by a factor of about 17, e.g., from about 3 FPS in the reservoir to 50 FPS in the shaft at the upper range of flow rates.

Sewage flowed through the vertical pipe and into the plunge pool as outlined above underwent a great change in appearance, resulting from an apparent homogenization of particles in the sewage. Laboratory tests of samples taken before and after the drop showed a marked increase in the amount of suspended solids and a marked decrease in the amount of settleable solids. Evidently the effect of the drop was to greatly decrease the average particle size. The presence of a partial vacuum in the upper portion of the pipe and the sudden change from positive to a negative pressure as the sewage flowed into the upper portion of the pipe apparently "exploded" the larger particles into many smaller particles, and the violent turbulence in the high velocity flow both in the pipe and in the plunge pool beneath the pipe evidently achieved a thorough mixing of the particles, with the resultant apparent homogenization.

Significant economic advantages are afforded by the simple but efficient particle size reduction in the described vacuum reactor as well as by the simple but efficient intimate and thorough mixing of recycled sludge in the vacuum reactor and plunge pool, and in the very small aeration or oxygenation tank required as compared to a conventional activated sludge treatment plant. The simple gravitational flow arrangement of FIG. 1 also may be obtained, for instance, by a shaft or conduit extending to an underground treatment area. Accordingly, only a very small surface area would be required, which would be a further economic benefit in many locations. By way of further illustration, a 12 inch vertical reactor shaft as described above could pass 25 MGD of sewage, equivalent to the flow from an average industrialized population of 100,000 persons plus associated industry. Three shafts each 48 inches in diameter, with associated underground clarifiers, sludge aeration or oxygenation tanks, and other appurtenances occupying a few acres of underground space, theoretically could process an average flow of 1000 MGD, equivalent to the world's largest present sewage treatment plant which occupies 500 acres of land. Considerable savings in construction cost also can be obtained by using such vertical shaft reactors as compared to using a conventional activated sludge plant.

Another apparatus for achieving the desired reduction in particle size of sewage solids is illustrated in FIG. 2. Here a pump 52 is connected to a venturi conduit section 54, with a relatively large diameter diffuser outlet section 56 connected to the venturi. The diffuser would discharge at atmospheric pressure to a receiving pool corresponding to plunge pool 26. In operation, the pump feeds the material to the venturi section under positive pressure. An abrupt change in pressure from positive gage pressure to vacuum (negative gage) will occur in the passage of the material through the venturi and into the section 56, with turbulence and agitation occurring in the section 56 and in the receiving pool. This apparatus and process step would be followed by clarification to separate the sludge and effluent, with subsequent treatment for the sludge and effluent as would be typical in biological treatment systems. For instance an arrangement for the related subsequent processing could be as shown and described with respect to FIG. 1.

Dividing the solid particles into relatively small and uniform particles as outlined above increases the homogenity of the mixture, increases the suspended solids, and concomittantly decreases settling and pretreatment separation of the solids. Moreover, since these results are obtained in a continuous flow operation, the improvements are well suited to use in sewage treatment and similar processes.

It will be appreciated that this invention may be utilized in various processes for handling and treating sewage and/or sludge other than a solids digestion and separation process as in FIG. 1. For instance such expansion, comminution and mixing may be used in processes for chemical treatment of pathogens in sewage or sludge, such as with chlorine, oxygen or ozone, or in increasing the uniformity, homogenity or flowability of such materials for other purposes. This may include rupturing cell walls of bacteria in sludge, for instance to improve flowability of the sludge, under appropriate pressure drop conditions.

It will be seen that improvements have been provided which meet the aforestated objects.

While particular embodiments of this invention have been described, it will be understood, of course, that the invention is not limited thereto since modifications may be made by those skilled in the art, particularly in light of the teachings herein. Therefore, it is contemplated by the appended claims to cover any such modifications as incorporate those features which may be said to constitute the essential features of these improvements, within the true spirit and scope of the invention.

What is claimed is:

1. A process of treating aqueous sewage material containing organic solids particles during flow of such material, including subjecting said material to a positive pressure in a first zone in a receptacle, flowing such material abruptly from such zone of positive pressure downward through a generally vertical conduit in a manner to provide a reactor zone of near absolute zero pressure subjacent said receptacle and full conduit flow beneath said reactor zone, precluding entry of air into said reactor zone, flowing such material from said zone of positive pressure into and through said reactor zone at high velocity, causing water vapor and gases suddenly to be separated and released in said material in said reactor zone, and permitting such water vapor and gases to expand suddenly in said reactor zone, thereby rupturing organic solids particles in said sewage material by the sudden expansion of such water vapor and gases and thereby disintegrating said particles into substantially smaller particles.

2. A process as in claim 1 wherein said material flows from said positive pressure first zone into the near absolute zero pressure area of said reactor zone in about 1/10 second or less.

3. A process as in claim 2 wherein the positive pressure on said material in said first zone is equal to a pressure head of about 10 feet of water.

4. A process of treating aqueous sewage material containing organic solids particles during flow of such material, including subjecting said material to a positive pressure in a first zone, flowing such material abruptly from such zone of positive pressure into and through a reactor zone of near absolute zero pressure at high velocity while excluding air from said zone, causing water vapor and gases suddenly to be separated and released in said material in said reactor zone, and permitting such water vapor and gases to expand suddenly in said reactor zone, thereby rupturing organic solids particles in said sewage material by the sudden expansion of such water vapor and gases and thereby disintegrating said particles into substantially smaller particles.

5. A process as in claim 4 comprising establishing a pool of said material with a portion of said material in said pool being under superatmospheric pressure, flowing said material from a superatmospheric pressure zone in said pool through a conduit, and establishing such reactor zone of near absolute zero pressure in said conduit adjacent said pool, wherein said material flows from said superatmospheric pressure zone directly into said reactor zone.

6. A process as in claim 5 including establishing said zone of near absolute zero pressure by gravity flow of said material from said reactor zone and controlling the inflow to said reactor zone.

7. A process as in claim 6 wherein said conduit extends vertically downward directly from said pool.

8. A process as in claim 7 including discharging said material from said conduit into a plunge pool.

9. A process as in claim 8 including adding biological sludge in said plunge pool.

10. A process as in claim 5 including subjecting such comminuted solids to bacterial processing, and adding a portion of the resulting sludge to said material in said pool.

11. A process as in claim 4 including adding biological sludge to said material prior to such sudden reduction in pressure.

* * * * *